United States Patent
Cunningham (12)

(10) Patent No.: US 9,395,019 B2
(45) Date of Patent: Jul. 19, 2016

(54) DEVICE FOR SEALING A VALVE

(71) Applicant: Dresser Inc., Addison, TX (US)

(72) Inventor: Thomas Henry Cunningham, North Easton, MA (US)

(73) Assignee: Dresser, Inc., Addison, TX (US)

( * ) Notice: Subject to any disclaimer, the term of this patent is extended or adjusted under 35 U.S.C. 154(b) by 278 days.

(21) Appl. No.: 13/928,884

(22) Filed: Jun. 27, 2013

(65) Prior Publication Data

US 2015/0001432 A1    Jan. 1, 2015

(51) Int. Cl.
*F16K 39/02* (2006.01)
*F16K 3/24* (2006.01)

(52) U.S. Cl.
CPC ............... *F16K 39/022* (2013.01); *F16K 3/243* (2013.01); *F16K 3/246* (2013.01)

(58) Field of Classification Search
CPC ........... F16K 1/00; F16K 39/00; F16K 39/02; F16J 9/20; F16J 47/08
USPC ........................... 251/365, 282, 186, 191, 325
See application file for complete search history.

(56) References Cited

U.S. PATENT DOCUMENTS

| | | | |
|---|---|---|---|
| 1,779,893 A | | 10/1930 | Charles |
| 2,035,165 A | * | 3/1936 | Jardine ........................ 123/188.8 |
| 3,073,689 A | * | 1/1963 | Kupfert et al. .................. 451/55 |
| 3,211,419 A | | 10/1965 | Hubert |
| 3,624,753 A | | 11/1971 | Brumm |
| 3,727,927 A | * | 4/1973 | Packard ......................... 277/434 |
| 3,751,784 A | * | 8/1973 | Packard ..................... 29/888.01 |
| 3,826,508 A | * | 7/1974 | Packard ......................... 277/466 |
| 3,926,166 A | * | 12/1975 | Packard ....................... 123/193.6 |
| 3,980,310 A | * | 9/1976 | Packard et al. ................ 277/466 |
| 4,083,529 A | | 4/1978 | Santy et al. |
| 4,123,072 A | * | 10/1978 | Sharpe .......................... 277/453 |
| 4,722,507 A | * | 2/1988 | Lindackers et al. ............. 251/80 |
| 4,978,102 A | | 12/1990 | Schuchart et al. |

(Continued)

FOREIGN PATENT DOCUMENTS

| | | |
|---|---|---|
| BE | 372724 A | 8/1930 |
| EP | 0 900 962 | 5/2003 |

(Continued)

OTHER PUBLICATIONS

International Search Report and Written Opinion issued in connection with corresponding Application No. PCT/US2014/041193 on Sep. 26, 2014.

*Primary Examiner* — Craig Schneider
*Assistant Examiner* — Daniel P Donegan
(74) *Attorney, Agent, or Firm* — Paul Frank + Collins P.C.

(57) ABSTRACT

Embodiments of a seal element for use in a trim assembly that allow valves and, in particular, balance control valves to meet high-temperature and shut-off requirements. These embodiments can engage and disengage a cage element and a plug element of the trim assembly, thereby creating a seal that prevents leaks of working fluid that can compromise operation of the valve. In one embodiment, the seal element comprises an annular ring that circumscribes the outer periphery of the plug element. The annular ring can deflect in response movement of one part of the plug element relative to another part of the plug element. This deflection can cause the seal element to contact the cage element and the plug element in seal regions that are proximate to one another, and to the outer periphery of the plug element.

20 Claims, 7 Drawing Sheets

(56) References Cited

U.S. PATENT DOCUMENTS

| | | | |
|---|---|---|---|
| 5,564,674 A | 10/1996 | Kälin et al. | |
| 5,899,435 A * | 5/1999 | Mitsch et al. | 251/62 |
| 6,634,352 B2 * | 10/2003 | Maiello | 126/307 R |
| 6,851,658 B2 * | 2/2005 | Fitzgerald et al. | 251/282 |
| 7,810,816 B1 * | 10/2010 | Halling | F01D 9/023 277/312 |
| 7,926,784 B2 * | 4/2011 | Fleming | 251/282 |
| 8,152,134 B2 * | 4/2012 | Stenberg | 251/121 |
| 8,167,269 B2 * | 5/2012 | Bell et al. | 251/325 |
| 8,256,462 B2 * | 9/2012 | Lin et al. | 137/630 |
| 8,272,399 B2 | 9/2012 | Farrow et al. | |
| 8,408,231 B2 | 4/2013 | Lo et al. | |
| 8,671,988 B2 * | 3/2014 | Lin et al. | 137/630.15 |
| 9,022,070 B2 * | 5/2015 | Anderson | 137/625.3 |
| 2002/0017327 A1 | 2/2002 | Kawaai et al. | |
| 2002/0047100 A1 * | 4/2002 | Lorraine | 251/57 |
| 2004/0149950 A1 * | 8/2004 | Fitzgerald et al. | 251/282 |
| 2005/0023496 A1 * | 2/2005 | Foster | 251/191 |
| 2007/0210270 A1 | 9/2007 | Stephenson et al. | |
| 2010/0148447 A1 * | 6/2010 | Halling | E21B 33/04 277/314 |
| 2010/0243936 A1 * | 9/2010 | Nesje | 251/282 |
| 2010/0270491 A1 | 10/2010 | Faas | |
| 2012/0292550 A1 | 11/2012 | Meek | |
| 2012/0323379 A1 | 12/2012 | Robertson, III | |
| 2014/0014865 A1 * | 1/2014 | Anderson | 251/213 |
| 2014/0137947 A1 | 5/2014 | Cunningham | |
| 2015/0001432 A1 * | 1/2015 | Cunningham | 251/365 |

FOREIGN PATENT DOCUMENTS

| | | | |
|---|---|---|---|
| FR | 2658261 | A | 8/1991 |
| GB | 247589 | A | 6/1926 |
| JP | 6132864 | U | 2/1986 |
| JP | 4203205 | A | 7/1992 |
| WO | WO2010091291 | | 8/2010 |

* cited by examiner

DEVICE FOR SEALING A VALVE

BACKGROUND

The subject matter disclosed herein relates to improvements in valve and valve technology and, in particular, to improvements in balanced control valves.

Control valves include devices that regulate transmission and distribution of a working fluid (e.g., liquids and gases). These devices integrate into process control systems in a wide variety of industries, e.g., oil and gas processing, power generating, refining, petrochemical, and water control industries. These process control systems may form a control loop with remote sensors and other feedback elements to monitor process conditions (e.g., temperature, pressure, etc.). The control loop can generate signals that cause the control valve to modulate flow of the working fluid, e.g., in response to changes in the process conditions.

Examples of control valves may include a cage, a plug, a stem, and a seat ring. The valves may also have an inlet port and an outlet port. During operation, the stem can affect force onto the plug. This force can change the position of the plug relative to the seat ring to modulate flow of the working fluid between the inlet port and the outlet port. Some types of control valves (also, "balanced control valves") allow working fluid to flow through the plug, e.g., via axial openings in the plug, to balance the pressure across the plug. These types of valves may include a seal that prevents the working fluid from leaking between the plug and the cage when the valve is closed.

Construction of the valve and, in particular, the seal may need to comport with operating conditions consistent with certain applications, processes, and/or industries. Some applications require the valve to handle working fluids at very low (e.g., cryogenic applications) or very high temperatures (e.g., temperatures of 600° C. or greater). Moreover, these applications may also require the valve to meet certain standards, e.g., standards that define minimum and maximum operating characteristics. These standards may, for example, categorize shut-off requirements for the valve as an amount of fluid that can leak downstream when the valve is closed. In one example, IEC 60534-4 defines this amount for one category of valves at a maximum of 0.0005 ml of water per minute, per inch of port diameter, per PSI differential pressure as measured from an inlet port of the valve to an outlet port of the valve. Valves in this category are often referred to as "Class V" valves.

Unfortunately, many materials and/or manufacturing techniques for components of the valves (including the seal) do not result in robust valves that can meet both the high temperature and tight shut-off requirements. For example, seals made of TEFLON® provide excellent shut-off, but are not suitable for use with working fluid at high temperatures. Seals made of graphite and metal, on the other hand, can withstand higher temperatures of the working fluid. However, components made of these materials often generate friction that may not afford the valve with adequate control performance that meets the requirements for applications that require "Class V" valves.

BRIEF DESCRIPTION OF THE INVENTION

This disclosure describes embodiments of a seal element for use in a trim assembly that allow valves and, in particular, balance control valves to meet high-temperature and tight shut-off requirements. These embodiments can engage and disengage a cage element of the trim assembly, thereby creating a seal that prevents leaks of working fluid that can compromise operation of the valve. In one embodiment, the seal element comprises an annular ring that circumscribes the outer periphery of the plug element. The annular ring can deflect in response movement of one part of the plug element relative to another part of the plug element. This deflection can cause the seal element to contact the cage element and the plug element in seal regions that are proximate to one another, and to the outer periphery of the plug element. These seal regions are in close proximity to one another, which effectively reduces the area of the seal element that is subject to pressure differential, e.g., when the plug element is in position to prevent flow of working fluid through the trim assembly.

BRIEF DESCRIPTION OF THE DRAWINGS

Reference is now made briefly to the accompanying drawings, in which.

Where applicable like reference characters designate identical or corresponding components and units throughout the several views, which are not to scale unless otherwise indicated.

DETAILED DESCRIPTION

Figure 1:
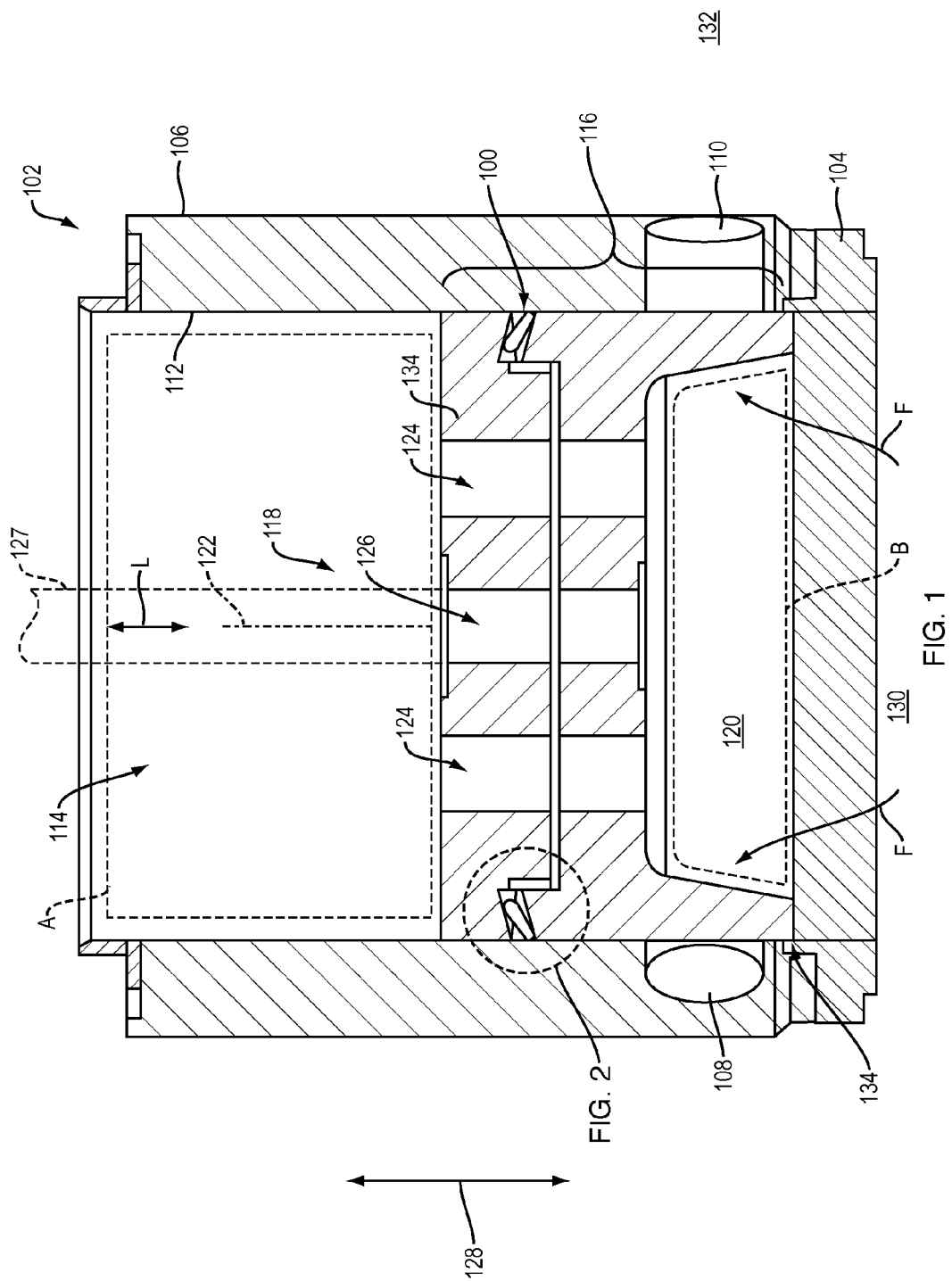
FIG. 1 depicts an elevation, cross-section view of an exemplary embodiment of a seal element for use on a plug element of a trim assembly, wherein the plug element is in a first position to prevent flow of a working fluid.

FIG. 1 depicts a schematic representation of a cross-section of an exemplary embodiment of a seal element 100. The seal element 100 is part of a trim assembly 102 for use in valves (e.g., control valves) that regulate flow of working fluid throughout the infrastructure of a process facility. These valves include "balanced control valves" that distribute pressure of working fluid across components to reduce the amount of force necessary to move these components during operation of the valve.

The trim assembly 102 includes a seat ring element 104 and a cage element 106 with one or more openings (e.g., a first opening 108 and a second opening 110) and an inner surface 112 that circumscribes a piston chamber 114. The trim assembly 102 also includes a plug element 116 with an upper part 118, a lower part 120, and a center axis 122. One or more openings 124 extend between the upper part 118 and the lower part 120 to place an upper volume (A) of the piston chamber 114 in flow connection with a lower volume (B) of the piston chamber 114. The plug element 116 also has a central bore 126 that can receive a stem element 127, shown generally in phantom lines. The stem element 127 is useful to couple the plug element 116 with an actuator of a valve. This actuator can generate a load L on the stem element 127 to cause the plug element 116 to transit among positions in the piston chamber 114, generally indicated by the enumerated arrow 128. These positions can regulate flow of a working fluid F, e.g., from an upstream side 130 to a downstream side 132 of the trim assembly 102. The example of FIG. 1 shows the plug element 116 in a first position under a first load that creates a first seal 134 between features on the upstream side 130 of the plug element 116 with the seat ring element 104. The first seal 134 prevents the working fluid F from flowing through the second opening 110 to the downstream side 132 of the trim assembly 102.

Embodiments of the seal element 100 can engage components of the valve to provide a tight shutoff that prevents leaks. This tight shutoff makes the trim assembly 102 compatible, e.g., for use in Class V valves. The embodiments of the seal element 100, however, incorporate structure that can easily disengage from the cage element 106, e.g., in response to changes in operation of a valve to open and/or modulate the working fluid. For example, this structure reduces the area of the seal element 100 that is subject to pressure differential and, thus, allows for changes to the geometry of the seal element 100 that may reduce the force required to deflect and/or operate the seal element 100, e.g., to engage and disengage from cage element 106 of the valve. The resulting reduction in area that is subject to differential pressure may further allow strain energy of the seal element 100 to act to disengage the seal element 100 from the cage element 106 when actuator force is removed. This feature effectively allows construction of the trim assembly 102 without venting mechanisms (also "pilot balancing mechanisms"), which are often necessary to remove high seating forces prior to operation of conventional valves. These venting mechanisms may complicate the design and increase the costs of the trim assembly.

Figure 2:
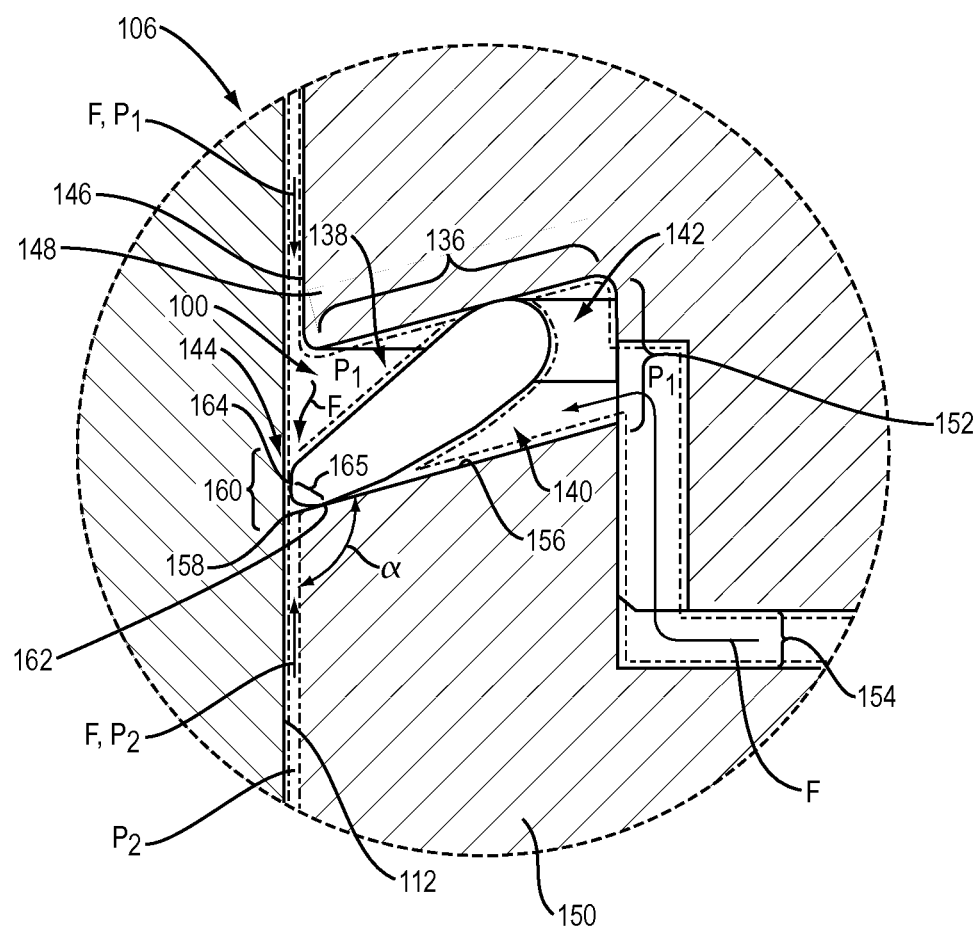
FIG. 2 depicts detail view of the seal element of FIG. 1.

As best shown in the detail view of FIG. 2, the seal element 100 has a body 136 with a top 138, a bottom 140, an inner radial end 142, and an outer radial end 144. The plug element 116 has an outer peripheral surface 146 proximate the inner surface 112 of the cage element 106. Construction of the trim assembly 102 creates clearance between these surfaces to allow the plug element 116 to move (e.g., movement 128 of FIG. 1) relative to the seat ring element (e.g., seat ring element 104 of FIG. 1). In one construction, the plug element 116 may comprise separate plug elements (e.g., a first plug element 148 and a second plug element 150). The plug elements 148, 150 form a seal feature 152. Examples of the seal feature 152 can form a groove, channel, and/or recess in the plug element 116 to receive at least a portion of the seal element 100 therein. This construction can form a gap 154 that spaces the first plug element 148 apart from the second plug element 150. In one example, the second plug element 150 has a sealing surface 156 disposed at an angle α to the outer peripheral surface 146. The angle α can vary, e.g., as from about 90° or greater. As shown in the present example, the sealing surface 156 meets with the outer peripheral surface 146 at an edge 158.

In the first position, the seal element 100 forms a second seal 160 that prevents working fluid F in the clearance between the inner surface 112 of the cage element 106 and the outer peripheral surface 146 of the plug element 116. The second seal 160 can have one or more seal regions (e.g., a first seal region 162 and a second seal region 164). As shown in FIG. 2, the seal regions 162, 164 form a pressure affected area 165 at which there is a pressure differential caused by the working fluid F having a first pressure P1 above the seal element 100 and acting on parts of the seal element 100 that are exposed in the gap 154 and a second pressure P2 below the seal element 100 in the first position. The proximity of the seal regions 162, 164 to one another reduces the size of the pressure affected area 165, thus reducing the force required to maintain the second seal 160. In turn, the trim assembly 102 does not require a pilot balancing mechanism found in many conventional valves.

The seal regions 162, 164 can define one or more locations of contact that form the requisite shut-off to prevent the flow of working fluid, as noted above. For example, the second seal region 164 may include one or more locations of contact between the seal element 100 and the inner surface 112 of the cage element 106. Examples of the first seal region 162 may include one or more locations of contact between the seal element 100 and the sealing surface 156 on the second plug element 150. The locations of the first seal region 162 may be found in an annular area that circumscribes at least part of the plug element 116 and, in one example, is formed proximate the edge 158 and/or covering about 6% or less of the total area of the plug element 116.

During operation, loading on the plug element 116 in the first position can cause the first plug element 148 to translate relative to the second plug element 150. This translation effectively changes the dimensions of the gap 154, e.g., as between a first gap dimension and a second gap dimension that is smaller than the first gap dimension. In one embodiment, this movement can also deflect the seal element 100, e.g., from a first deflected position to a second deflected position. In the first deflected position, the seal element 100 does not contact the inner surface 108 of the cage element 106. Movement from the first deflected position to the second deflected position forces the inner radial end 142 to move, e.g., downwardly and/or inwardly towards the second plug element 150. This movement also changes the position of the outer radial end 144, thereby causing the outer radial end 144 to engage the inner surface 112 of the cage element 106 in the second seal region 164. The change from the first deflected position to the second deflected position also causes a surface on the first side 140 of the seal element 100 to slide across the sealing surface 156 on the second plug element 150. This sliding action will effectively stop when the outer radial end 144 contacts the inner surface 112 of the cage element 106. In one example, the surface on the first side 140 of the seal element 100 will create and/or maintain sealing contact with the sealing surface 156 at one or more location within the first seal region 162.

Embodiments of the seal element 100 are configured to disengage from one or both of the seal regions 162, 164 in response to reduction in loading on the plug element 116, e.g., by removing thrust that the actuator of a valve applies to the plug element 116 to maintain the plug element 116 in the first position. The seal regions 162, 164 are in proximity relative to one another, and to the inner surface 112, to effectively minimize the size of the pressure affected area 165 of the seal element 100. This feature, in turn, further helps to reduce the amount of seating force that is necessary to generate the seal; and, moreover, reducing the size of the pressure affected area 165 allows for changes to the geometry of the seal element 100 that may reduce the force required to deflect and/or operate the seal element 100, e.g., to engage and disengage from cage element 106 of the valve. The structure of the seal element 100 can also store strain energy in the second deflected position that helps to facilitate the response, e.g., to disengage from the seal regions 162, 164. These features of the structure of the seal element 100 may permit the trim assembly 102 to forgo complicated balancing mechanisms (also "pilot balancing mechanisms") to remove high seating forces prior to movement of the plug element 116, e.g., from the first position to a second position at which the plug element 116 is spaced apart from the seat ring element (e.g., seat ring element 104 of FIG. 1).

Figure 3:
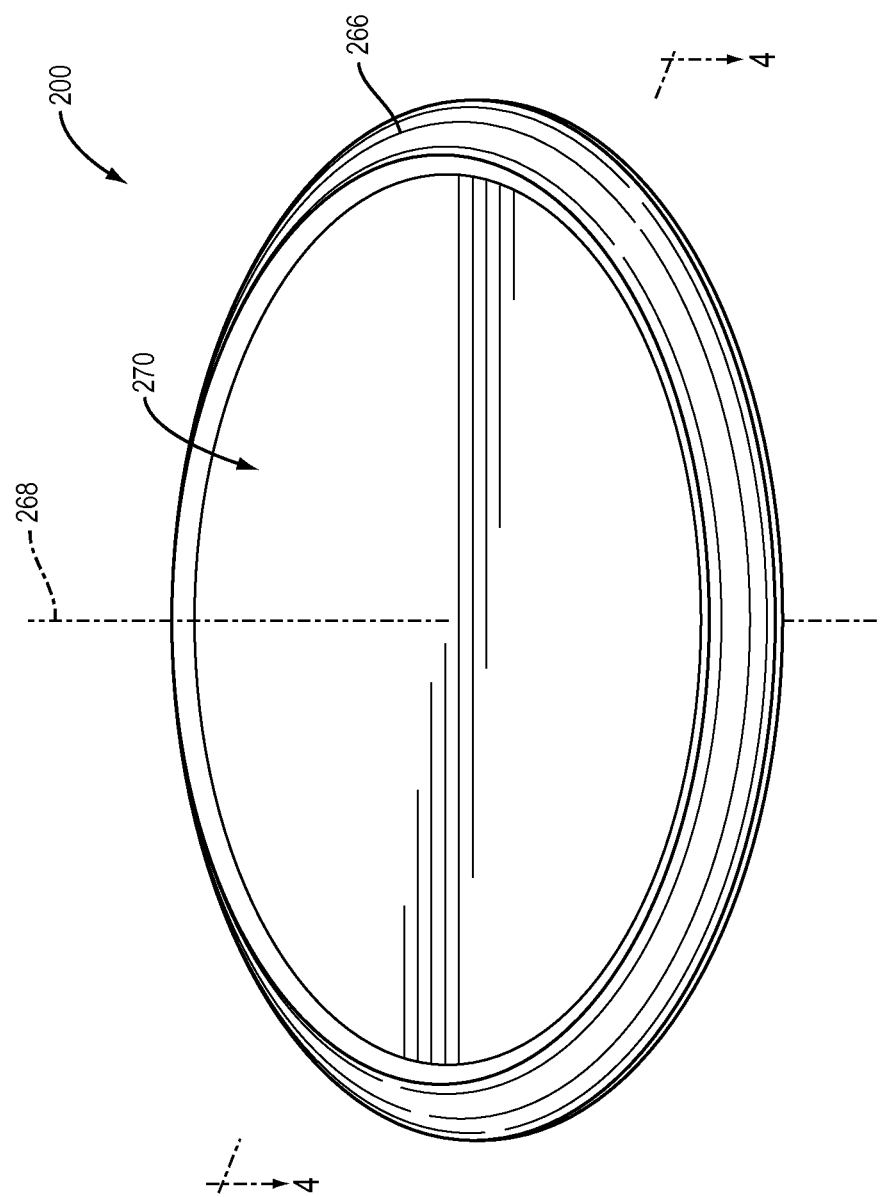
FIG. 3 depicts a top, perspective view of an exemplary embodiment of a seal element.
Figure 4:
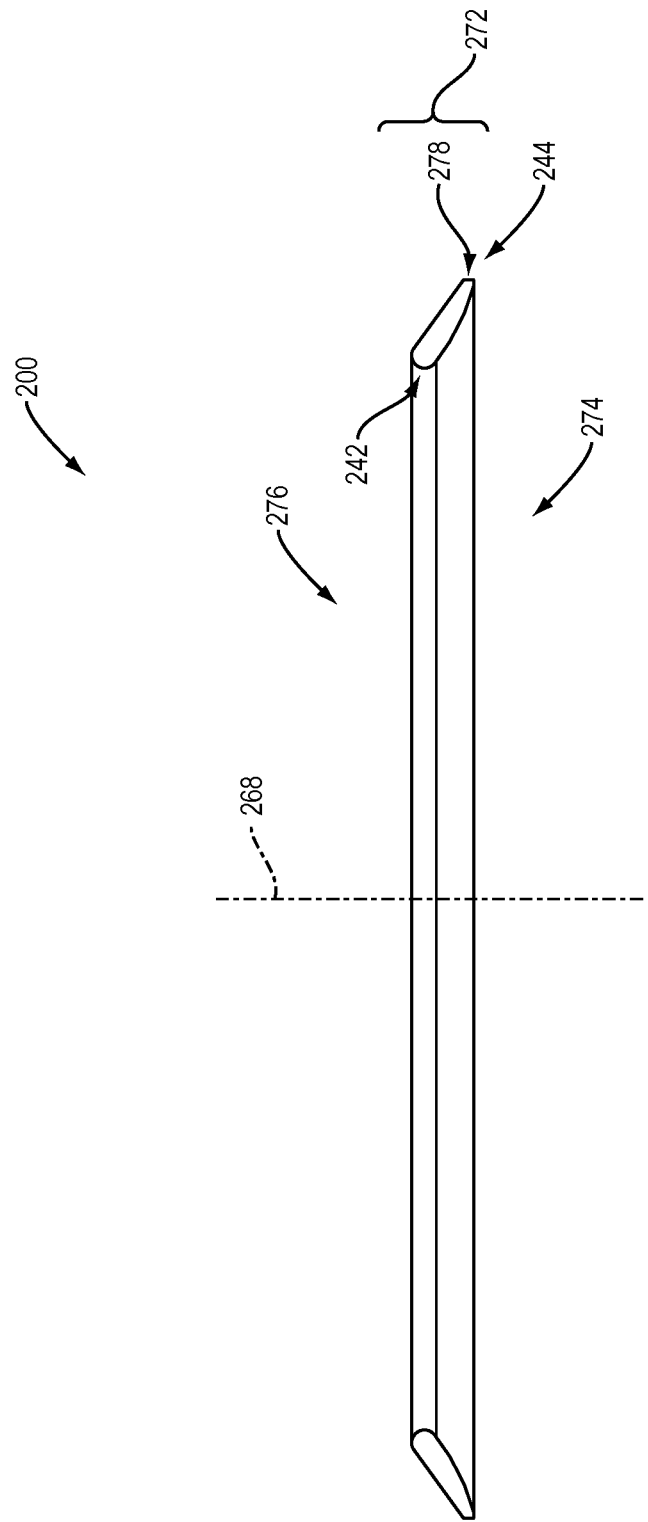
FIG. 4 depicts a plan, cross-section view of the seal element of FIG. 4.
Figure 5:
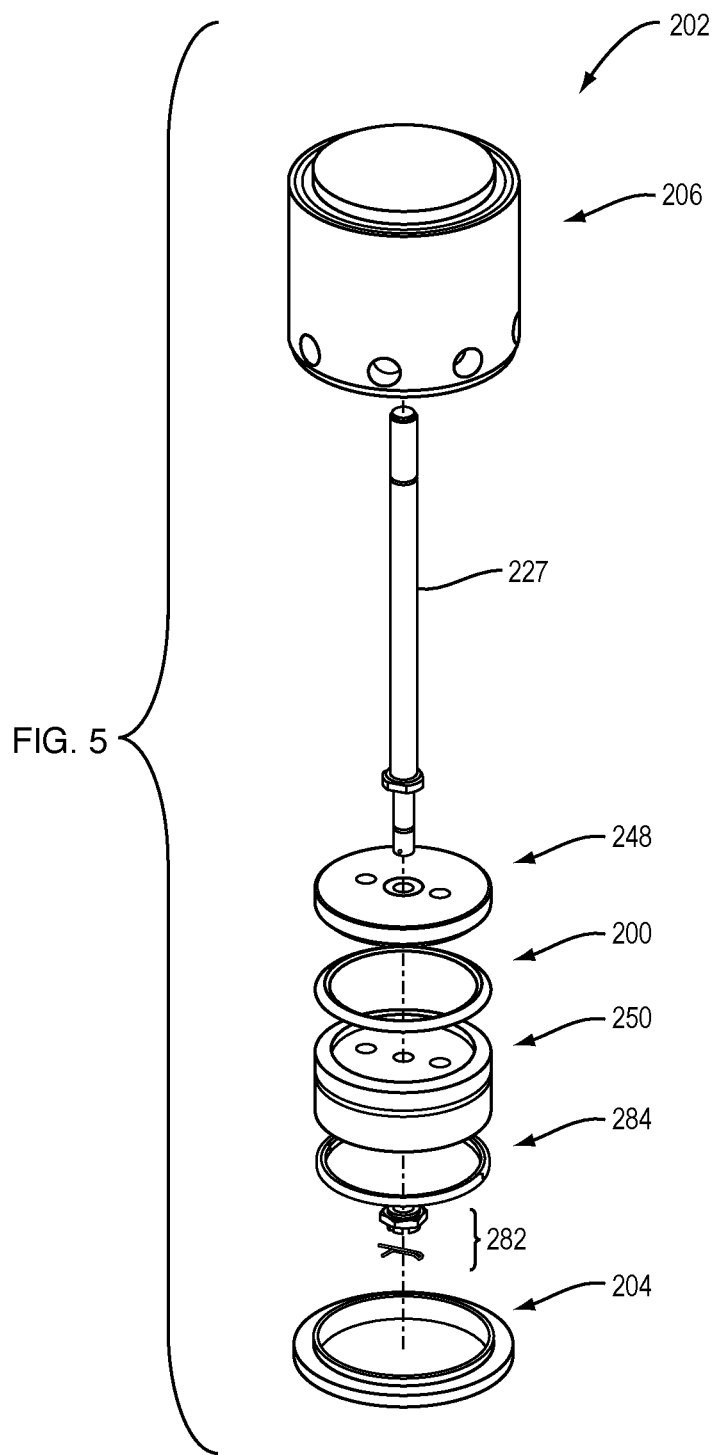
FIG. 5 depicts a top, perspective view of the seal element of FIG. 4 as part of a trim assembly in exploded form.

FIGS. 3 and 4 depict an exemplary embodiment of a seal element 200. In the perspective view of FIG. 4, the seal element 200 forms an annular ring 266 with a central axis 268 and a central opening 270. FIG. 4 depicts an elevation, cross-section view of the seal element 200 taken at line 5-5 of FIG. 4. In the example of FIG. 5, the annular ring 266 forms a frusto-conical body 272 with a concave side 274 and a convex side 276.

Examples of the annular ring 266 include springs and resilient devices that can deflect under load. In one embodiment, the annular ring 266 comprises a spring washer (e.g., Belleville washers) that can deform under substantially constant loading. These devices can comprises a variety of materials, e.g., metals, plastics, composites, etc. In one example, the annular ring 266 may have a bi-furcated material design that utilizes a first material and a second material that is different from the first material. This design may be helpful to dictate the properties of the annular ring 266. For example, the first material may have certain properties (e.g., strength, rigidity, etc.) to construct a majority of the structure of the annular ring 266. The second material may construct at least part of the outer radial end 244 of the annular ring 266. In one example, the outer radial end 244 may form a tip end 278 that comprises the second material, e.g., graphoil.

Figure 6:
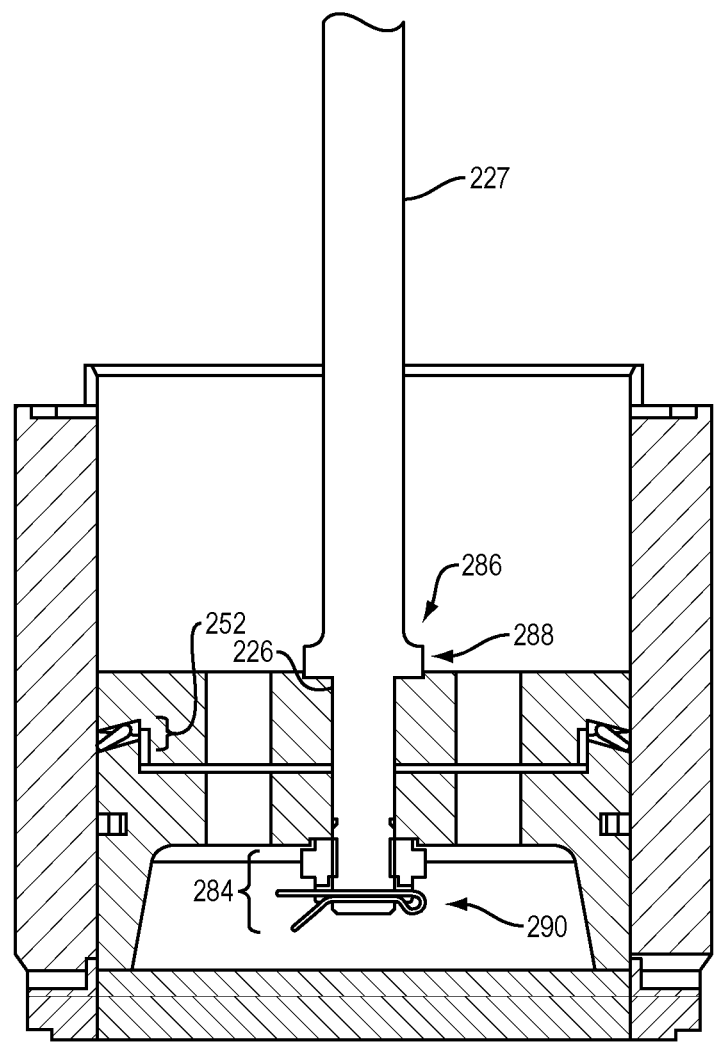
FIG. 6 depicts a plan, cross-section view of the trim assembly of FIG. 6 in assembled form.
Figure 7:
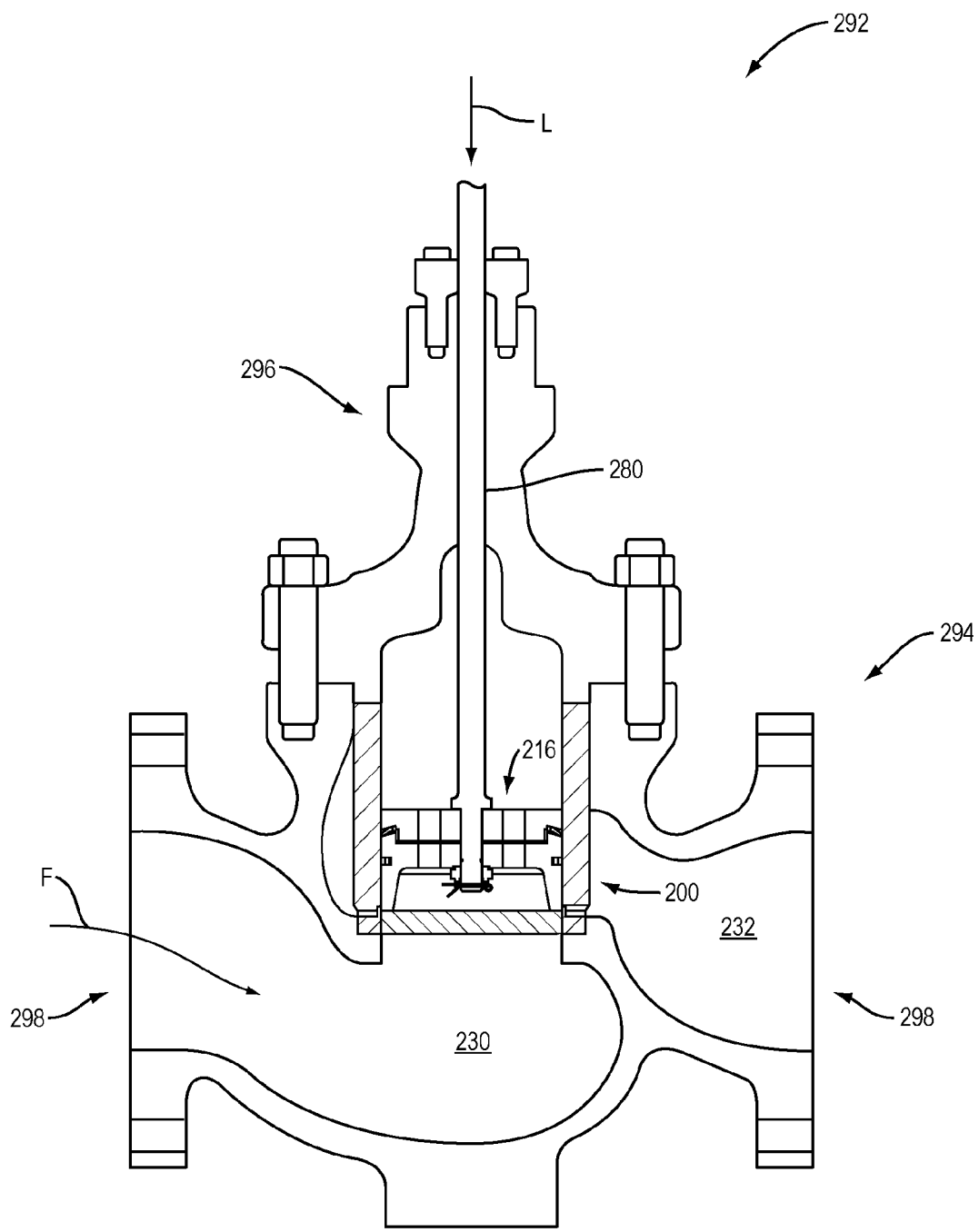
FIG. 7 depicts a plan, cross-section view of the trim assembly of FIG. 6 in use as part of a valve.

FIGS. 5, 6, and 7 depict the seal element 200 as part of a trim assembly 202. In the perspective view of FIG. 5, the trim assembly 202 is shown in exploded form. The trim assembly 202 has a stem assembly that includes the stem element 227 and a fastener element 282. The trim assembly 202 also includes a flow restrictor 284, e.g., in the form of a piston ring. FIG. 6 depicts an elevation, cross-section view of the seal element 200 with the trim assembly 202 in assembled form. In the present construction, the stem element 280 has a first section 286 that includes a stop element 288 and an end 290. Examples of the end 290 may include threads and/or other features (e.g., holes, apertures, grooves, etc.) that can receive the fastener element 284 thereon. The first section 286 of the stem element 280 can insert into the bore 226 on the plug elements 248, 250 to position the plug elements 248, 250 between the stop element 288 and the end 290. This configuration creates the seal feature 252 to receive and capture the seal element 200 between the plug elements 248, 250. In one example, the fastener element 284 is useful to compress and/or apply a pre-load on the seal element 200. This pre-load can help maintain the plug elements 248, 250 in position relative to one another until loading occurs during operation in a valve.

FIG. 7 depicts a plan, cross-section view of the trim assembly 202 as part of a valve 292 with the plug element 216 in the first position. Examples of the valve 292, as noted herein, can include control valves and like devices that find use in process facilities to manage flow of working fluids. The valve 292 has a valve body 294 and bonnet 296 that secures to the valve body 294, e.g., via one or more fasteners. The valve body 294 may have one or more inlet/outlets 298 that may be configured with a flange and/or other mating feature. Examples of the flange allow the valve 292 to couple with pipes, tubes, and other elements that can transport the working fluid F.

The valve may also include an actuator that couples with the stem 270. Examples of the actuator include pneumatic and electro-pneumatic devices that can generate the load L. The stem 270 directs the load L to the plug element 216. As noted herein, the plug element 216 can incorporate structure that will transmit the load L to the seal element 200, thus compressing and/or deflecting the seal element 200 in the first position to generate a first seal (e.g., first seal 134 of FIG. 1) and a second seal (e.g., second seal 160 of FIG. 2).

In view of the foregoing, embodiments of the seal element proposed herein can improve sealing and shut-off for use in the trim assemblies that are compatible with Class V valves. These improvements minimize the unbalanced area on the seal element that is subject to pressure differential when the valve is closed. Minimizing the unbalanced area effectively reduces the seating force that is necessary to maintain this tight shut-off. Moreover, the embodiments proposed herein can operate without pilot balancing mechanisms, which in effect simplifies the design and operation of the trim assembly and, ultimately, reduces the cost of the valve.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A valve, comprising:
    a cage element with an inner wall;
    a plug element disposed in the cage element, the plug element having a center axis and an upper part and a lower part, each of the upper part and the lower part having an outer peripheral surface proximate the inner wall of the cage element, the upper part and the lower part forming a seal feature, the seal feature between the upper part and the lower part, the seal feature having a sealing surface forming a peripheral edge with the outer peripheral surface; and
    a seal element disposed in the seal feature, the seal element having a first seal surface proximate the sealing surface and a second seal surface proximate the inner wall of the cage element,
    wherein the upper part and the lower part of the plug element are configured to move relative to one another to change a dimension of the seal feature from a first dimension to a second dimension that is smaller than the first dimension,
    wherein the seal element has a first deflected position and a second deflected position that corresponds with the first dimension and the second dimension, respectively, and
    wherein the first deflected position configures the seal element, under load, spaced apart from the cage element and the second deflected position configures the seal element, under load, in contact with the cage element and so that the first seal surface contacts the sealing surface of the seal feature in a seal region that is proximate the outer peripheral edge.

2. The valve of claim 1, wherein the second seal surface contacts the inner wall in the deflected position.

3. The valve of claim 1, wherein the seal element comprises an annular ring that circumscribes the center axis.

4. The valve of claim 1, wherein the seal element comprises a spring washer having a convex side and a concave side that forms the first seal surface thereon.

5. The valve of claim 4, wherein the spring washer comprises metal.

6. The valve of claim 1, wherein the seal element has an outer radial end proximate the outer peripheral surface that forms a tip end, wherein the seal element comprises a first material and a second material that is different from the first material, and wherein the tip end comprises the second material.

7. The valve of claim 6, wherein the second material comprises graphoil.

8. The valve of claim 1, wherein the sealing surface forms an angle with the outer peripheral surface that is 90° or greater.

9. A valve, comprising:
a trim assembly comprising a seat ring element, a cage element having an inner surface forming a piston chamber, and a plug element disposed in the piston chamber, the plug element comprising a first plug element, a second plug element that forms an annular groove with the first plug element, and a seal element forming an annular ring disposed in the annular groove and circumscribing about a center axis of the plug element, the annular ring having a convex side and a concave side, wherein the concave side faces the seat ring element,
wherein the first plug element and the second plug element have an outer peripheral surface proximate the wall of the piston chamber,
wherein the first plug element and the second plug element are configured to move relative to one another to change a dimension of the annular groove, and
wherein the dimension configures the annular ring in a first deflected position and a second deflected position, one each that locates the annular ring, under load, spaced apart from the inner surface of the cage element and in contact with the inner surface of the cage element, respectively.

10. The valve of claim 9, wherein the annular ring has a first seal surface on the concave side that forms a first seal region with the plug element in a deflected position.

11. The valve of claim 10, wherein the annular ring has an outer radial surface that forms a second seal region with the inner surface of the cage element in the deflected position.

12. The valve of claim 11, wherein the first seal region resides proximate the outer peripheral surface of the plug element.

13. The valve of claim 10, wherein the annular groove has a first dimension and a second dimension that is smaller than the first dimension, and wherein the second dimension corresponds to the deflected position of the seal element.

14. The valve of claim 10, wherein the trim assembly comprises a stem element with a first section that extends through the first plug element and the second plug element, wherein the first section has a stop feature and terminating at an end having a fastener disposed thereon, and wherein the first plug element and the second plug element are disposed between the stop feature and the fastener.

15. A plug element for a valve, comprising:
a first plug element having a first peripheral surface;
a second plug element configured to receive the first plug element so that the first plug element is moveable with respect to the second plug element, the second plug element having a second outer peripheral surface that aligns circumferentially with the first peripheral surface and is spaced apart from the first peripheral surface by an annular groove with the first plug element disposed in the second plug element, the second plug element having a sealing surface disposed at an angle relative to the second outer peripheral surface, the second plug element having a recess interior to the second peripheral surface to allow part of the first plug element to overlap with part of the second plug element; and
a seal element disposed in the annular groove between the first plug element and the second plug element to position a surface in contact with the sealing surface, the seal element having an inner radial end proximate the first plug element and an outer radial end proximate the second plug element.

16. The plug element of claim 15, wherein the angle between the sealing surface and the outer peripheral surface is 90° or greater.

17. The plug element of claim 15, wherein the first plug element is spaced apart from the second plug element to form a gap, wherein the gap has a first dimension and a second dimension that is smaller than the first dimension, and wherein the second dimension corresponds to a deflected position for the seal element that positions the first seal surface in a seal region on the sealing surface that is proximate an outer peripheral edge of the second plug element.

18. The valve of claim 1, wherein the sealing region is found in an annular area that circumscribes the plug element proximate the outer peripheral edge and covering 6% or less of a total area of the plug element.

19. The valve of claim 9, wherein the sealing region is found in an annular area that circumscribes the plug element proximate the outer peripheral edge and covering 6% or less of a total area of the plug element.

20. The valve of claim 17, wherein the sealing region is found in an annular area that circumscribes the second plug element proximate the second outer peripheral edge and covers 6% or less of a total area of the second plug element.

* * * * *